US008856641B2

(12) United States Patent
Pueyo

(10) Patent No.: US 8,856,641 B2
(45) Date of Patent: Oct. 7, 2014

(54) TIME-TAGGED METAINFORMATION AND CONTENT DISPLAY METHOD AND SYSTEM

(75) Inventor: Lluis Garcia Pueyo, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 1022 days.

(21) Appl. No.: 12/236,647

(22) Filed: Sep. 24, 2008

(65) Prior Publication Data

US 2010/0077290 A1 Mar. 25, 2010

(51) Int. Cl.
*G06F 17/00* (2006.01)
*H04N 21/431* (2011.01)

(52) U.S. Cl.
CPC ............................. *H04N 21/4316* (2013.01)
USPC ........................... 715/230; 715/753; 348/460

(58) Field of Classification Search
CPC .................................................. H04N 21/4316
USPC ................... 715/230; 707/E17.014; 709/203; 348/460

See application file for complete search history.

(56) References Cited

U.S. PATENT DOCUMENTS

| | | | | | |
|---|---|---|---|---|---|
| 4,805,020 | A | * | 2/1989 | Greenberg | 348/460 |
| 4,945,412 | A | * | 7/1990 | Kramer | 348/460 |
| 6,078,948 | A | * | 6/2000 | Podgorny et al. | 709/204 |
| 7,103,548 | B2 | * | 9/2006 | Squibbs et al. | 704/260 |
| 2001/0011364 | A1 | * | 8/2001 | Stoub | 717/1 |
| 2001/0023436 | A1 | * | 9/2001 | Srinivasan et al. | 709/219 |
| 2002/0124051 | A1 | * | 9/2002 | Ludwig et al. | 709/204 |
| 2004/0128317 | A1 | * | 7/2004 | Sull et al. | 707/104.1 |
| 2005/0033760 | A1 | * | 2/2005 | Fuller et al. | 707/100 |
| 2006/0050794 | A1 | * | 3/2006 | Tan et al. | 375/240.26 |
| 2007/0088712 | A1 | * | 4/2007 | Watson et al. | 707/10 |
| 2007/0169155 | A1 | * | 7/2007 | Pasquale et al. | 725/81 |
| 2007/0177854 | A1 | * | 8/2007 | Ando et al. | 386/126 |
| 2007/0180488 | A1 | * | 8/2007 | Walter et al. | 725/135 |
| 2007/0266304 | A1 | * | 11/2007 | Fletcher et al. | 715/500.1 |
| 2008/0086688 | A1 | * | 4/2008 | Chandratillake et al. | 715/719 |
| 2008/0178110 | A1 | * | 7/2008 | Hill et al. | 715/771 |
| 2008/0276159 | A1 | * | 11/2008 | Narayanaswami et al. | 715/202 |
| 2009/0012995 | A1 | * | 1/2009 | Sartor et al. | 707/104.1 |
| 2009/0024671 | A1 | * | 1/2009 | Johnson et al. | 707/201 |
| 2009/0087161 | A1 | * | 4/2009 | Roberts et al. | 386/66 |
| 2009/0106642 | A1 | * | 4/2009 | Albornoz et al. | 715/230 |
| 2009/0119706 | A1 | * | 5/2009 | Hope et al. | 725/38 |
| 2009/0132935 | A1 | * | 5/2009 | Van Zwol | 715/756 |
| 2009/0165634 | A1 | * | 7/2009 | Mahowald | 84/610 |
| 2009/0240564 | A1 | * | 9/2009 | Boerries et al. | 705/10 |
| 2009/0262238 | A1 | * | 10/2009 | Hope et al. | 348/441 |
| 2009/0327856 | A1 | * | 12/2009 | Mouilleseaux et al. | 715/230 |
| 2010/0008639 | A1 | * | 1/2010 | Greenberg et al. | 386/52 |
| 2010/0042642 | A1 | * | 2/2010 | Shahraray et al. | 707/102 |
| 2010/0287473 | A1 | * | 11/2010 | Recesso et al. | 715/716 |
| 2011/0246186 | A1 | * | 10/2011 | Takeda | 704/201 |

OTHER PUBLICATIONS eSports: Collaborative and Synchronous Video Annotation System in GridComputing Environment by Gang Zhai et al presented at IEEE International Symposium on Multimedia 2005, pp. 1-9.*
A Synchronous Multimedia Annotation System for Secure Collaboratories by Ronald Schroeter et al., presented at the Second IEEE International Conference on e-Science and Grid Computing in 2006, pp. 1-7.*

* cited by examiner

*Primary Examiner* — William Bashore
*Assistant Examiner* — Nathan Shrewsbury
(74) *Attorney, Agent, or Firm* — James J. DeCarlo; Greenberg Traurig, LLP

(57) ABSTRACT

Disclosed herein are methods and systems for displaying content-related metainformation, and display of content-related tag metainformation in correspondence, and synchronized, e.g., time-based, with the content, so as to display content together with related time-tag information.

47 Claims, 11 Drawing Sheets

Figure 1:
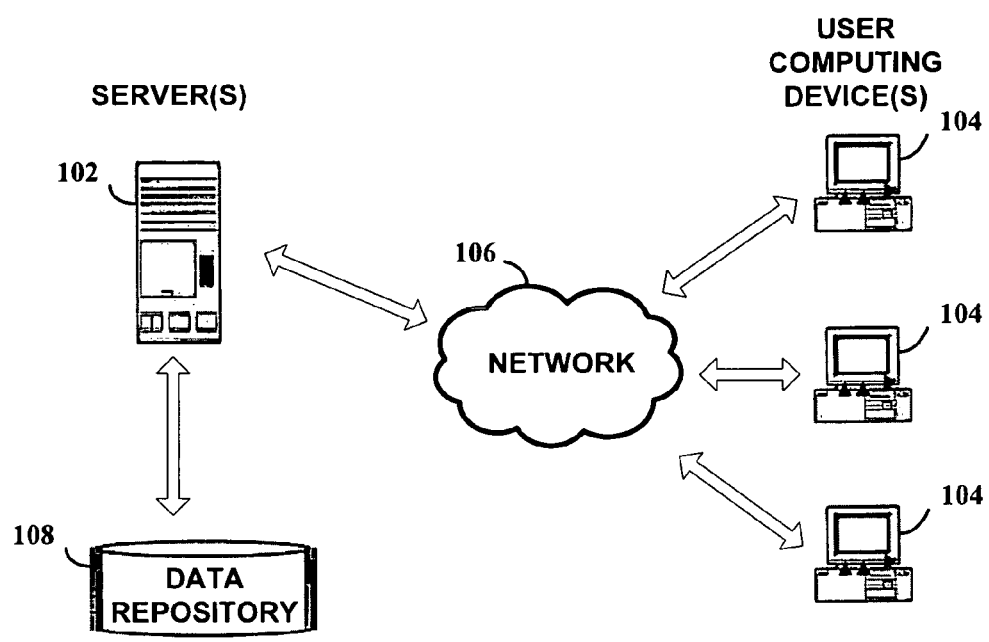

| 602A | 602B | 602C |
|---|---|---|
| UserID: Garcia<br>ContentID: URL-A | UserID: deepblue<br>ContentID: URL-A | UserID: robocop<br>ContentID: URL-A |

| Time Tag | Value | Time Tag | Value | Time Tag | Value |
|---|---|---|---|---|---|
| t1 | universal | t6 | suspect | t3 | catface |
| t2 | large | t9 | watch | t7 | computerwall |
| t4 | fingers | | | t11 | price$$ |
| t5 | screen | | | | |
| t8 | touch | | | | |
| t10 | clock | | | | |

FIGURE 6

TIME-TAGGED METAINFORMATION AND CONTENT DISPLAY METHOD AND SYSTEM

FIELD OF THE DISCLOSURE

The present disclosure relates to methods and systems for displaying content-related metainformation, and more particularly, to display content-related tag metainformation in correspondence, and synchronized, e.g., time-based, with the content, so as to display content together with related time-tag information.

BACKGROUND

Sharing content, such as user generated video content or other content, has been greatly facilitated by the Internet. For example, Internet sites, such as YouTube and Flickr, offer applications that allow users to upload content, e.g., user-generated content, and to share the content with others that access the site(s). Metadata, or metainformation, are terms used to refer to "data about data." In the present disclosure, the term metainformation is used to refer to both metadata and metainformation. In the context of content, e.g., audio, video, etc., metainformation may be data about the content. One example of metainformation comprises tags. Flickr, for example, allows a user to tag an image with terms, e.g., nouns, verbs, and adjectives, etc. A tag can aid in describing content, such as an image, the user's reaction to, or commentary about, the content, etc. In some cases, a tag can be associated with the content as a whole, or with a specific portion of the content, e.g., a frame or other portion of streaming audio or video streaming content. A tag provides a mechanism for organizing content and allows the content to be searchable, such that the content can be recalled based on a tag that is associated with the content.

SUMMARY

There is a need to be able to display metainformation in correspondence, and synchronization, with the display of content to which the metainformation is related. The present disclosure seeks to address this and other failings in the art and to provide time-tagged metainformation and content display systems and methods.

By way of one non-limiting example, embodiments of the present disclosure allow content, such as video content and a set of related tags, to be displayed in time correspondence, synchronized with the content. In so doing, a user is able to watch both the video content and the tags in relative time. In accordance with one or more embodiments, tags provided by different sources and related to the same content can be displayed in a manner that differentiates the sources. By way of a non-limiting example, one or more tags provided by one user are differentiated from one or more tags provided by another user. Furthermore, tags associated with one or more users can be differentiated with respect to a time associated with the tag, so as to differentiate between times associated with tags relative to a given user's tags and/or to differentiate between tag times relative to one or more users' tags. By way of a non-limiting example, a time associated with a tag can represent a time that the tag is input by a user. By way of a further non-limiting example, in a case of streaming content, the time associated with a tag can represent a point in time during playback of the content when the tag was input by the user. As a further non-limiting example, as video streaming content is being displayed, tags input by multiple users are displayed in a manner to differentiate the source and timing of each tag relative to other sources and tag times.

In accordance with one or more embodiments, metainformation associated with content is time tagged, and synchronized with streaming content, so that the streaming content can be experienced with the associated time-tagged metainformation, which can be experienced in a visually structured manner in accordance with a time-based sort of one user's time-tagged metainformation or at a more comprehensive level across multiple user's time-tagged metainformation. In a case of multiple users' tags, embodiments of the present disclosure differentiate one user's tags from the others tags.

In accordance with one or more embodiments, the metainformation associated with content is stored separately from the content. Alternatively, the metainformation can be stored with the content. In any case, the metainformation can comprise any information associated with content, which information can include information provided by one or more users while experiencing content, e.g., watching video content. By way of a non-limiting example, a user can input information concerning the content being experienced by the user, e.g., perceptions about the content, as an annotation for the content. One or more embodiments provide an ability to experience the content, e.g., video, and the information associated with the content, e.g., (video and time tagged annotations), together. In accordance with one or more such embodiments, the content and the metainformation can be experienced together even in a case that the content and metainformation comprise two separate information sources.

A user interface disclosed in accordance with one or more embodiments comprises a content player window for content being played by a multimedia content player; and a metainformation display portion that displays tags associated with the content played by the player, the tags being displayed in synchronization with play of the content.

In accordance with one or more embodiments, a system is disclosed which comprises a media server that receives a request for content and transmits the requested content to a device in response, and a metainformation server that receives a request for metainformation corresponding to the requested content, and in response, accesses a metainformation repository to retrieve metainformation corresponding to the requested content from the metainformation repository, the retrieved metainformation comprising at least one tag identified during a prior playback of the requested content, and transmits the at least one tag.

A method and computer-readable medium are disclosed in connection with one or more embodiments, which method comprises steps to, and which medium comprises code to, receive a request for content and access a content repository to retrieve the requested content, receive a request for metainformation corresponding to the requested content, and in response, access a metainformation repository to retrieve metainformation corresponding to the requested content from the metainformation repository, the retrieved metainformation comprising at least one tag created during a prior playback of the requested content.

In accordance with one or more embodiments, a device is disclosed that comprises a multimedia content player that controls play of content and display of a player window, and a metainformation display control that controls display of tags associated with the content, the tags being displayed in synchronization with play of the content, the tags being displayed in a metainformation display portion that is superimposed over at least a portion of the player window.

A method and computer-readable medium are disclosed in connection with one or more embodiments, which method comprises steps to, and which medium comprises code to, transmit a request for content, transmit a request for metainformation corresponding to the requested content, receive the requested content and metainformation, the metainformation comprising at least one tag corresponding to the requested content, each tag received being created during a prior playback of the requested content, and playing the content, displaying a player window and displaying in a metainformation display portion at least a portion of the received tags in synchronization with the content's play, the metainformation display portion is superimposed over at least a portion of the player window.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides examples of system components in accordance with one or more embodiments of the present disclosure.

Figure 2:
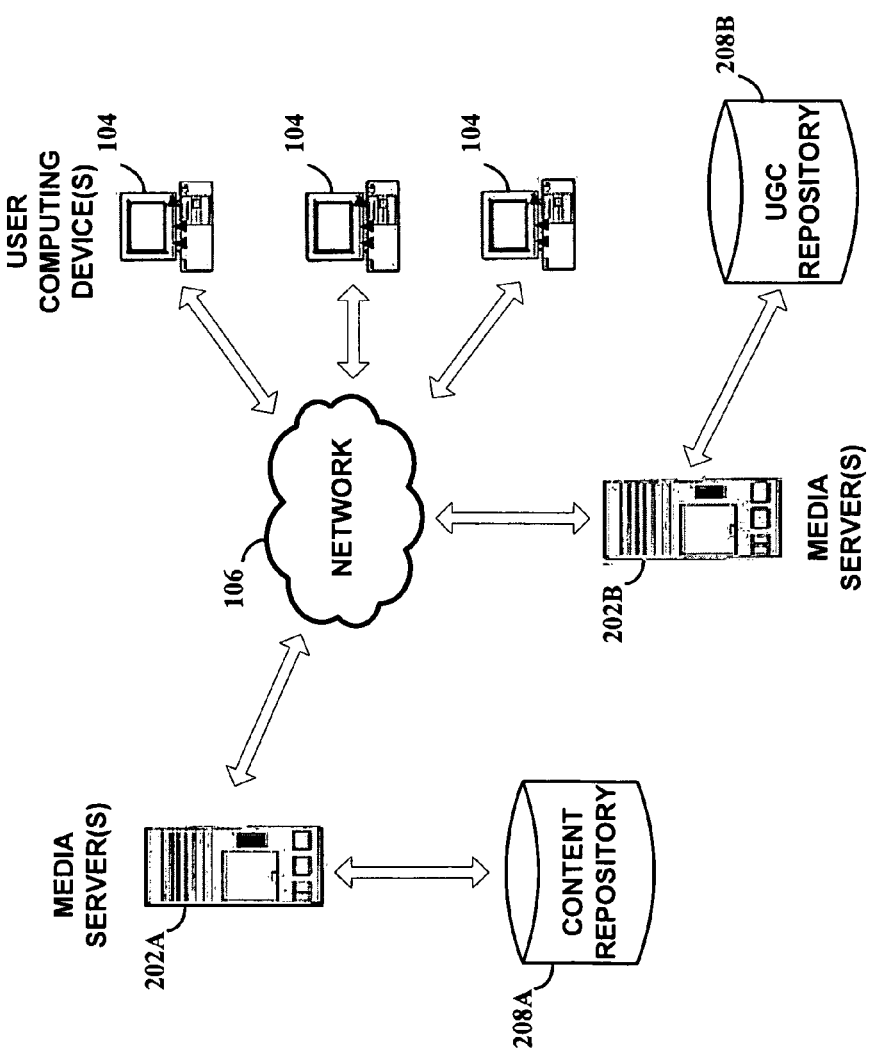

FIG. 2 provides an example showing use of multiple servers to serve content and time-tagged metainformation in accordance with one or more embodiments of the present disclosure.

Figure 3:
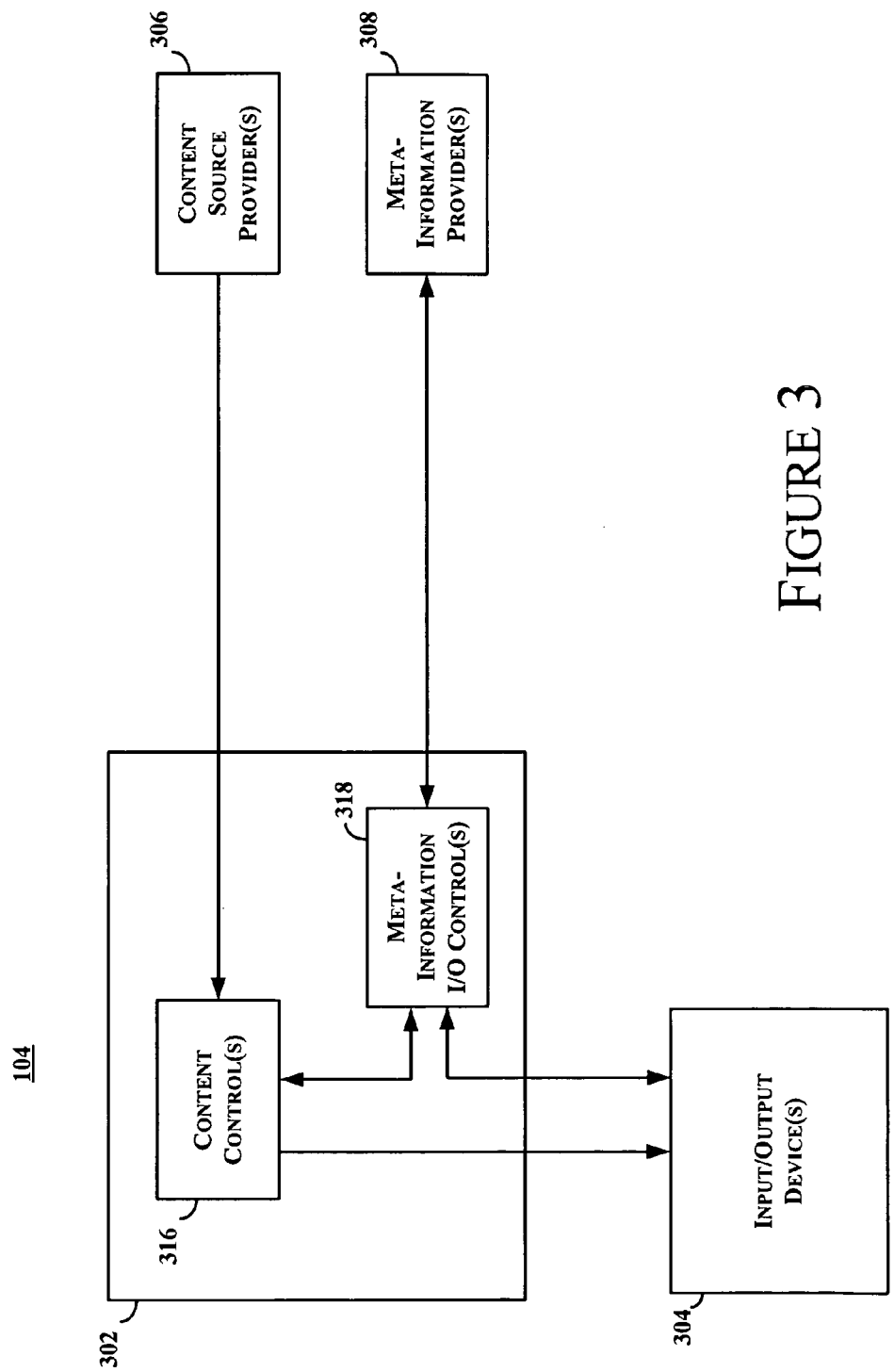

FIG. 3 provides another example of system components in accordance with one or more embodiments of the present disclosure.

Figure 4:
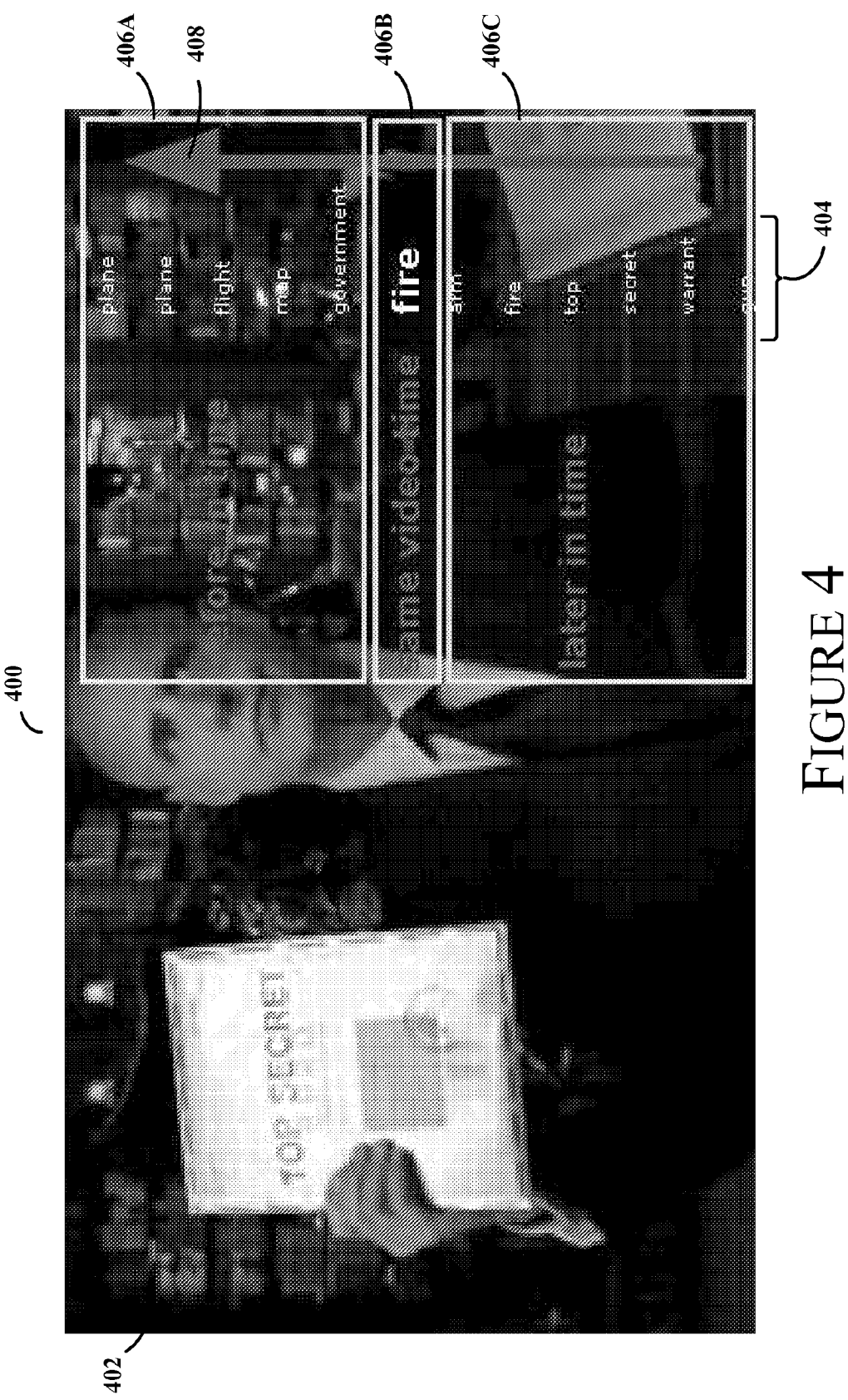

FIG. 4 provides an example of a display in accordance with one or more embodiments of the present disclosure.

Figure 5:
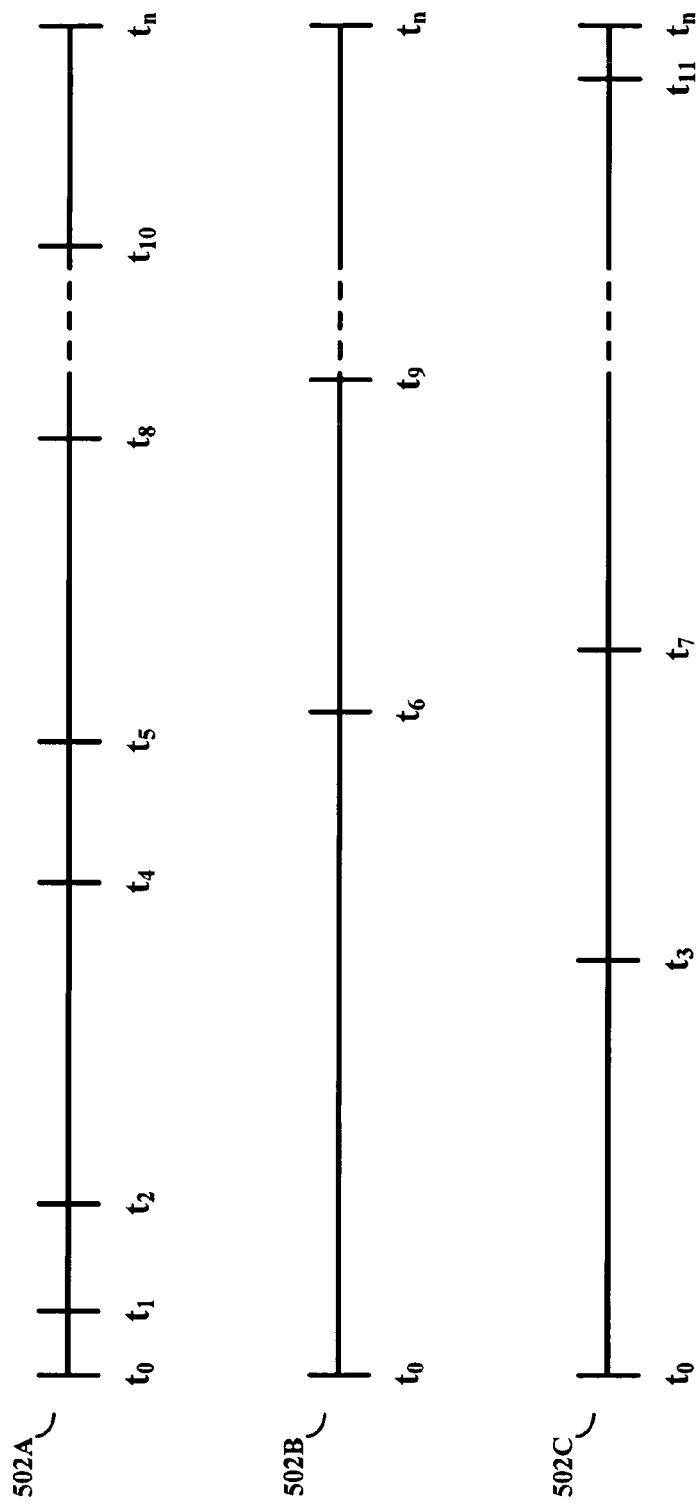

FIG. 5 provides a timing example in accordance with one or more embodiments of the present disclosure.

FIG. 6 provides an example of users' tag input and other corresponding metainformation saved by a meta-information server in accordance with one or more embodiments of the present disclosure.

Figure 7:
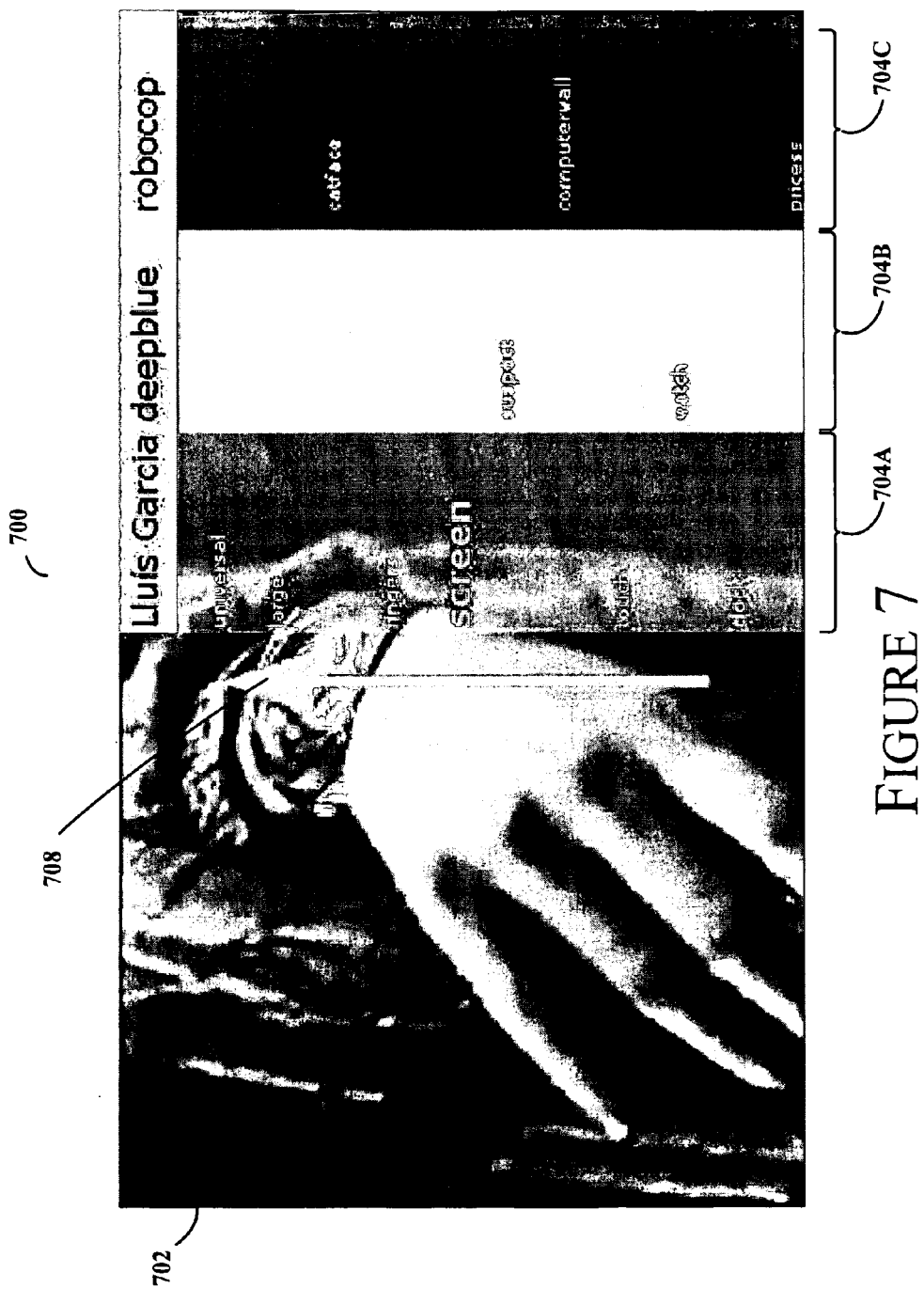

FIG. 7 provides an example of a display showing more than one list of tags in accordance with one or more embodiments of the present disclosure.

Figure 8:
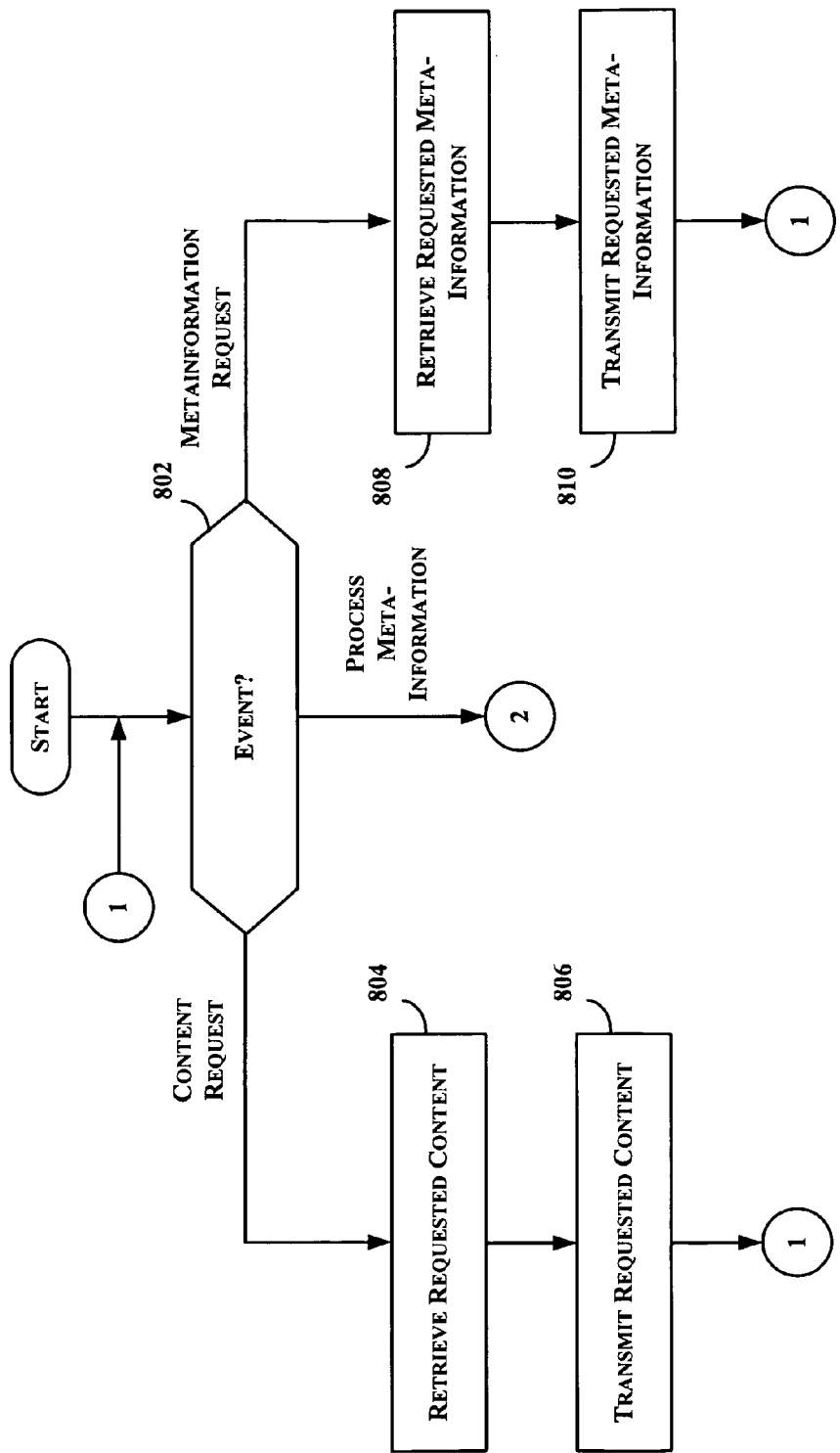

FIG. 8 provides a server event processing flow in accordance with one or more embodiments of the present disclosure.

Figure 9:
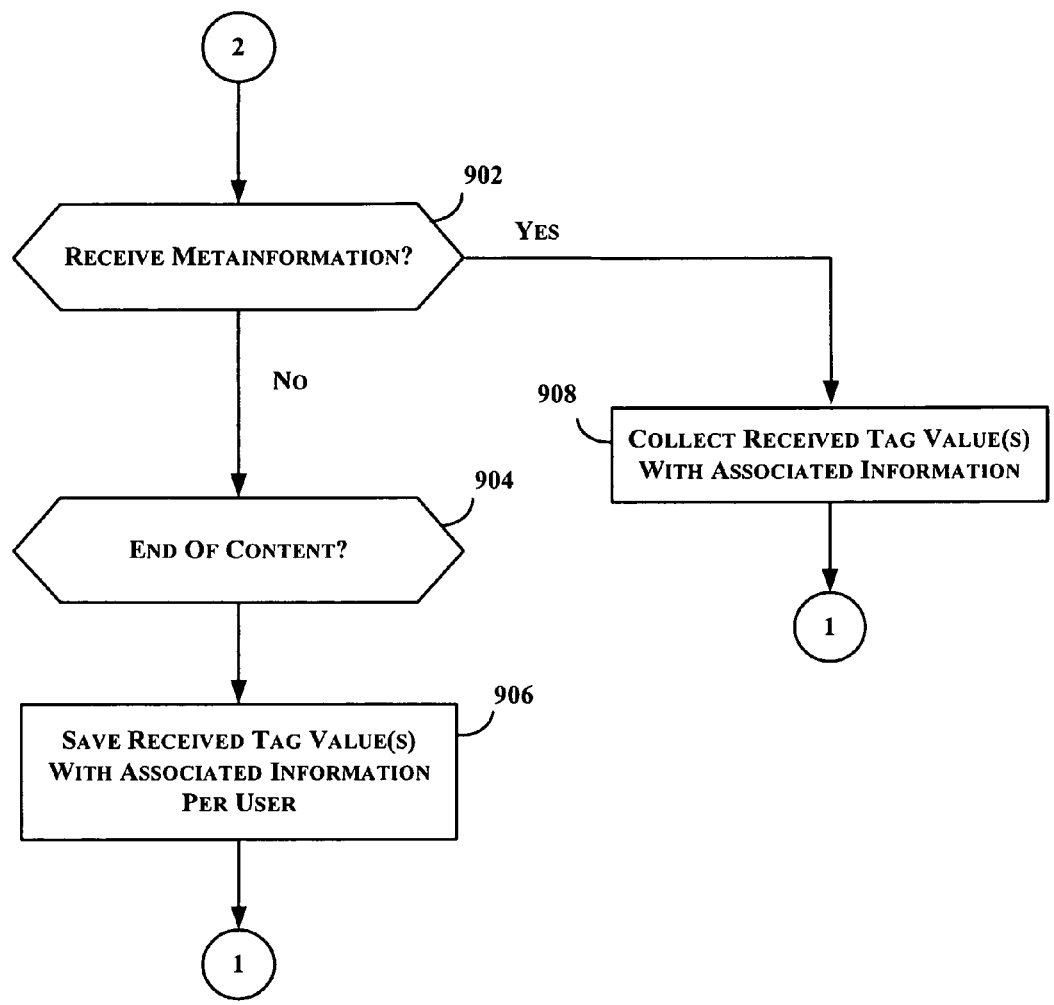

FIG. 9 provides a server metainformation event processing flow in accordance with one or more embodiments of the present disclosure.

Figure 10:
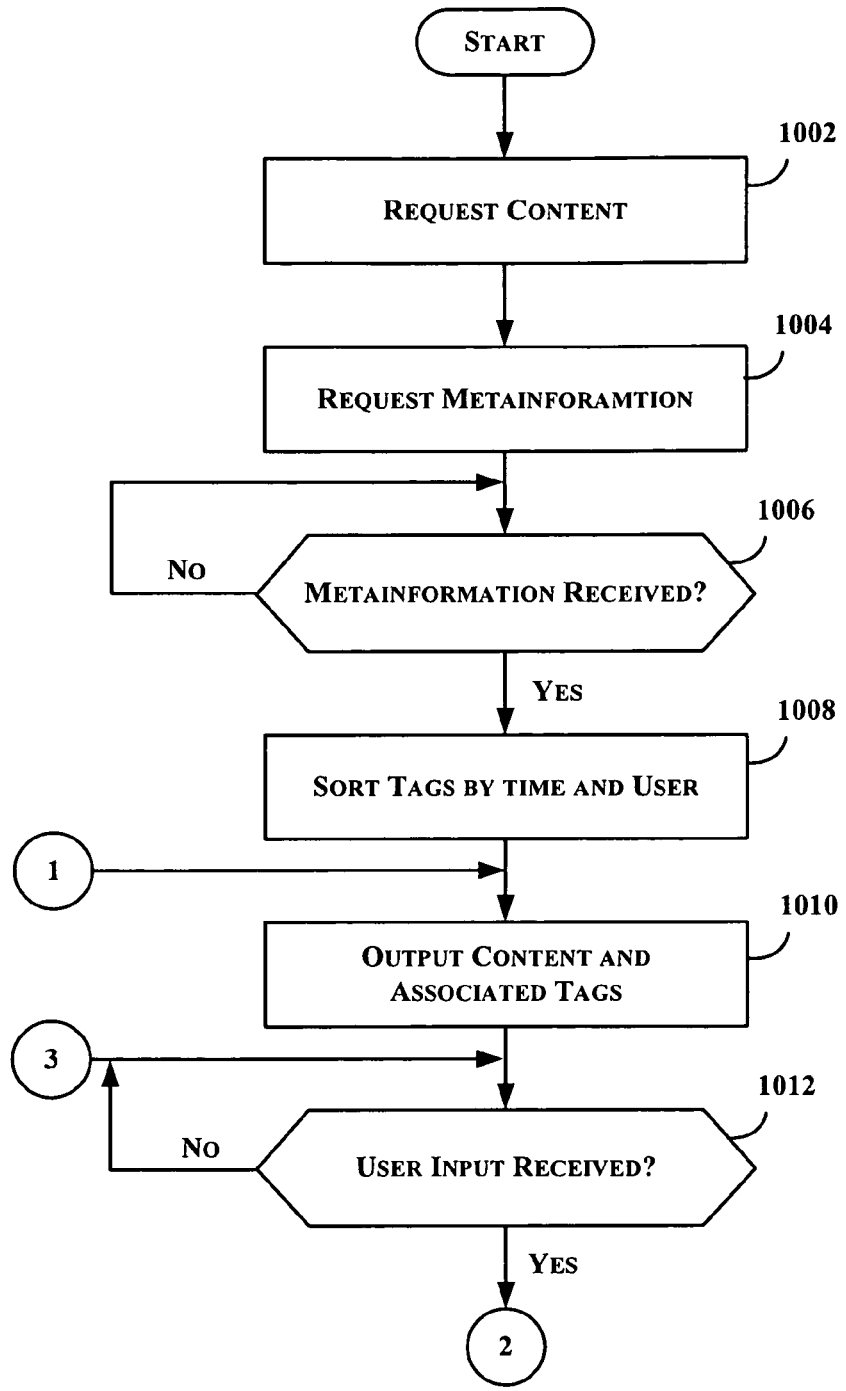

FIG. 10 provides a user device process flow in accordance with one or more embodiments of the present disclosure.

Figure 11:
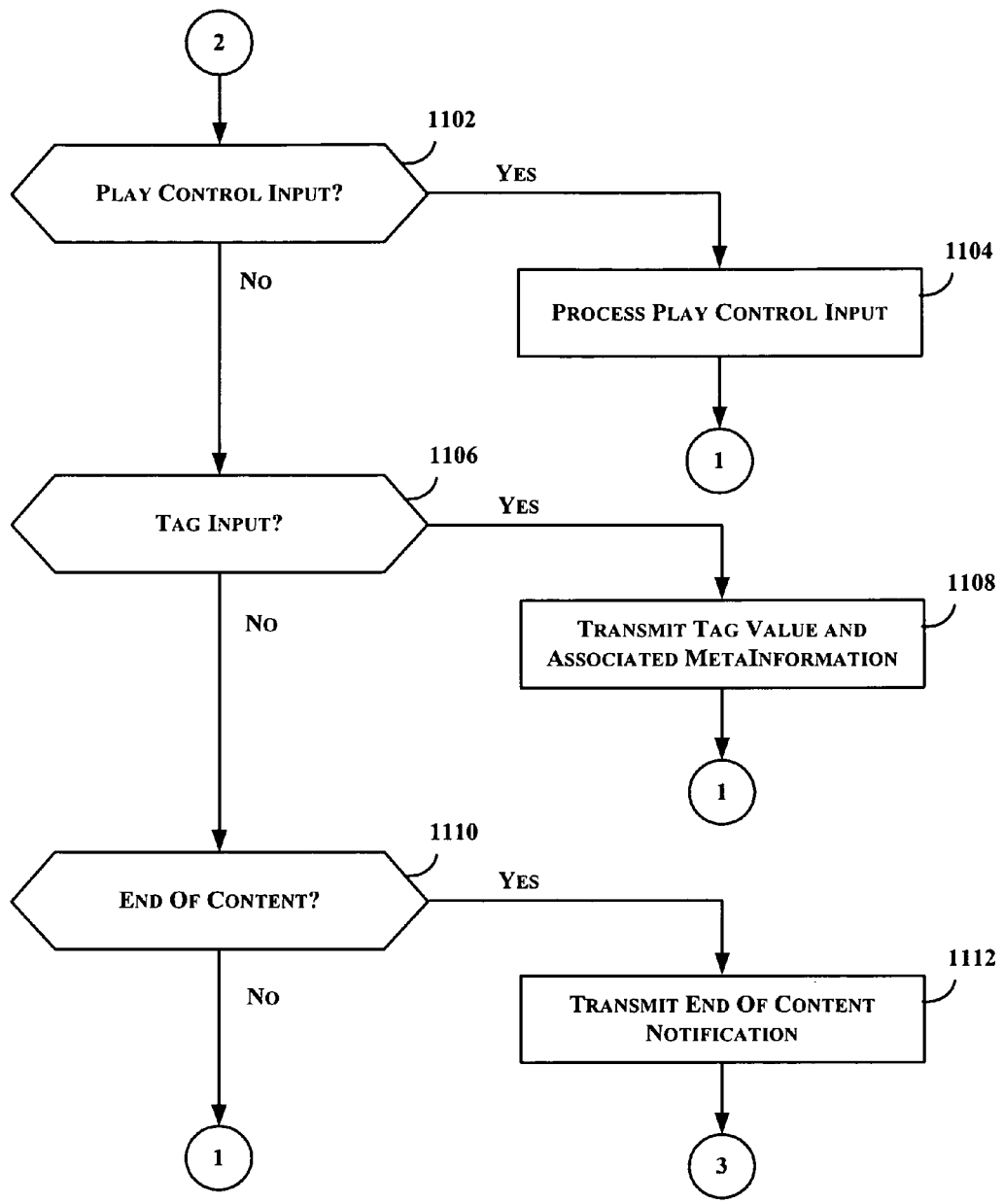

FIG. 11 provides a user input process flow in accordance with one or more embodiments of the present disclosure.

DETAILED DESCRIPTION

In general, the present disclosure includes a time-tagged metainformation and content display system, method and architecture.

Certain embodiments of the present disclosure will now be discussed with reference to the aforementioned figures, wherein like reference numerals refer to like components.

FIG. 1 provides examples of system components in accordance with one or more embodiments of the present disclosure. In accordance with one or more embodiments of the present disclosure, the system includes one or more servers 102, and one or more computing devices 104, which are configured to comprise functionality described herein. For example, a computing device 102 can be configured to receive time-tagged metainformation associated with content and to display the time-tagged metainformation in correspondence, and synchronized, with video in accordance with one or more embodiments of the present disclosure. In accordance with one or more embodiments, a server 102 is configured to store content in a data repository, such as data repository 108, or other store, and the same or another server 102 is configured to receive and store time-tagged metainformation corresponding to content in a data repository, or other store, 108. The server 102 is further configured to provide the time-tagged metainformation associated with content to computing device 104, so that the time-tagged metainformation can be experienced in correspondence, and synchronized, with the associated content. As discussed, the content can comprise video, audio or other multimedia content.

In accordance with one or more embodiments, server 102, which can comprise one or more instances of server 102, serves content to one or more user computing devices 104 for display at the computing device 104, e.g., using a browser and a player that comprises one or more control components, via a network 106. Server 102 stores time-tagged metainformation in a data repository 108, which can comprise one or more instances of data repository 108. In accordance with one or more embodiments, time-tagged metainformation comprising metainformation associated with content stored in a data repository 108 is served by server 102 to computing device 104. In accordance with one or more such embodiments, server 102 receives time-tagged metainformation from a computing device 104, e.g., after server 102 serves the content from data repository 108 to device 104. Server 102 receives the time-tagged metainformation and stores the received information in data repository 108. In accordance with one or more embodiments, the data repository 108 that stores the content is different from the data respository 108 that stores the metainformation.

The user computing device, or device, 104 can be any computing device, including without limitation a personal computer, personal digital assistant (PDA), wireless device, cell phone, internet appliance, media player, home theater system, and media center, or the like. For the purposes of this disclosure a computing device can be a device that includes a processor and memory for storing and executing program code, data and software, and may be provided with an operating system that allows the execution of software applications in order to manipulate data. In accordance with one or more embodiments, server 102 comprises a computing device, which can be similar to device 104. In accordance with one or more embodiments, server 102 and the user device 104 can include one or more processors, memory, a removable media reader, network interface, display and interface, and one or more input devices, e.g., keyboard, keypad, mouse, etc. and input device interface, for example. One skilled in the art will recognize that server 102 and device 104 may be configured in many different ways and implemented using many different combinations of hardware, software, or firmware.

In accordance with one or more embodiments, server 102 makes a user interface available to a device 104 via the network 106. In accordance with one or more embodiments, server 102 makes a user interface available to a device 104 via the network 106. The user interface made available to the device 104 can include one or more pages transmitted by server 102 via network 106 to device 104 and displayable by a browser application executed by the device 104. The one or more pages can be specified using any of a number of languages, including without limitation a markup language such as Hypertext Markup Language, scripts, applets and the like. The server 102 transmits content, e.g., video and/or audio content, to device 104 for display using the user interface. The user interface definition can be processed by an application executing on the device 104, such as a browser application, to output the user interface on a display coupled, e.g., directly or indirectly, to the device 104. In accordance with one or more embodiments, a content player, such as Adobe Flash player, executed by the device 104, which can be executed apart from or in window of the browser application, is used to experience content served by server 102. In addition to the content player, at least one other control component executed with the content player is used to capture user time-tagged metainformation input, and/or to display time-tagged metainformation, while content is experienced via the content player.

In an embodiment, the network 106 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

It should be apparent that embodiments of the present disclosure can be implemented in a client-server environment such as that shown in FIG. 1. Alternatively, embodiments of the present disclosure can be implemented other environments, e.g., a peer-to-peer environment as one non-limiting example.

For the purposes of this disclosure a computer readable medium stores computer data, which data can include computer program code executable by a computer, in machine readable form. In accordance with one or more such embodiments, program code is tangibly embodied in storage of the medium. By way of example, and not limitation, a computer readable medium may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

In accordance with one or more embodiments, content and time-tagged metainformation is served by different servers. FIG. 2 provides an example showing use of multiple servers to serve content and time-tagged metainformation in accordance with one or more embodiments of the present disclosure. The content is stored in a content repository 208A and served by server(s) 202A via progressive download or content streaming, for example, and network 106. The time-tagged metainformation is served by server(s) 202B from user-generated content (UGC) repository 208B, where the time-tagged metainformation is stored. The time-tagged metainformation served by media server 202B corresponds to the content served by server(s) 202A. Servers 202A and 202B serve the content and time-tagged metainformation to one or more devices 104 to be experienced at the each device 104 served. In accordance with embodiments of the present disclosure, the time-tagged metainformation is synchronized with the content. By way of a non-limiting example, the time-tagged metainformation is superimposed over at least a portion of the displayed content.

In accordance with one or more embodiments, the one or more servers 202B are configured to receive time-tagged metainformation input from one or more devices 104. In accordance with one or more such embodiments, a server 202B receives the time-tagged metainformation input, that includes tag values, together with information to identify the user that provides the time-tagged metainformation input, the content to which the time-tagged metainformation is associated, and a time of the input. In at least one embodiment, the time represents a time within the playback of the content to which the time-tagged metainformation is associated. It should be apparent that playback time can be measured in one of a number of manners, by frame, time expended, time remaining, etc.

FIG. 3 provides another example of system components in accordance with one or more embodiments of the present disclosure. In accordance with one or more such embodiments, a content player 302, e.g., a video content player such as Adobe's Flash player control, that executes at device 104 for a user to experience content provided by one or more content providers 306. Content provider 306 can be a server 202A that serves content from content repository 208A, for example. In accordance with one or more embodiments, the content served by a content provider 306 comprises digital media content provided to player 302 via a download technique, such as by way of a streaming or progressive download. It should be apparent that the digital content can be any form of digital content, including audio, video, multimedia etc. The player 302 displays the content received from content source provider 306.

Player 306 comprises at least one content control 316 and one or more metainformation input/output (I/O) controls 318. Player 306 can be an Adobe Flash player application and controls 306 and 318 can be Adobe Flex components under the player application, for example. Adobe Flash and Flex are provided by Adobe Systems. In accordance with one or more embodiments, content control 316 can be a Flex video display control, for example, which defines a window box, or window, with position and size parameters defined, to display the video content. Content control 316 can comprise playback controls, e.g., pause, reverse, fast forward, play, stop, etc. I/O control 318 can comprise one or more controls, such as one or more button, text and list controls. In accordance with one or more embodiments, the button and text controls can be used in metainformation input.

In accordance with one or more embodiments, I/O control 318 interacts with content control 316 to display one or more listings of time-tagged metainformation provided by one or more metainformation providers 308. By way of a non-limiting example, I/O control 318 comprises a list control configured to provide metainformation received from metainformation provider 308 as a list for display, e.g., within the confines or boundaries of the content window controlled by the content control 316. As is described in more detail below, the list is displayed in correspondence, and synchronized, with content displayed in the content window. By way of a non-limiting example, the list is superimposed over content displayed in the content window. In accordance with one or more such embodiments, a list control 318 is further configured to interact with one or more I/O controls 318, e.g., button and text I/O controls, to receive input comprising time-tagged metainformation, and to forward the input to a metainformation provider 308.

Content control 316 and metainformation I/O control 318 can interface with various I/O devices 304 of device 104. For example, content control 316 can interface with a display component of device 104 to display the content received from a content source provider 306, and/or to display metainformation received from metainformation provider 308. By way of a further non-limiting example, metainformation I/O control 318 can interface with a pointing device, such as a mouse, a keyboard, a microphone, etc., to receive metainformation input. By way of a non-limiting example, textual metainformation can be input manually via a keyboard or audibly via microphone input. In accordance with one or more embodiments, metainformation I/O control 318 is configured to retrieve, from metainformation provider 308, time-tagged metainformation related to content received by content control 316 from content source provider 306. As is described in more detail below, multiple time-tagged metainformation lists can be associated with content. In such a case and in accordance with one or more embodiments, multiple instances of metainformation I/O control 318, can be used, with each I/O control 318 configured as described herein and associated with a list. By way of a non-limiting example, each list can correspond to time-tagged metainformation provided by a user in connection with content.

In accordance with one or more embodiments, player 302 receives the content from content source provider 306 and the associated one or more time-tagged metainformation lists from metainformation provider 308, and displays the content and the metainformation. In accordance with one or more such embodiments, each metainformation list is sorted to generate an ordered list of tags. By way of a non-limiting example, each item of metainformation, e.g., a tag, or metatag or content tag, is associated with an index component, which identifies the order in which the tag was input relative to the other tags in the list, and the sorting is performed using the index components associated with the tags. By way of a further non-limiting example, each tag has an associated time of input, which corresponds with, e.g., is equal to, a playback time of a portion of content being displayed when the tag is input, and the sorting is performed using the time component associated with each of the tags. By way of yet another non-limiting example, player 302 can comprise a counter or timer, to maintain a play, or playback, time, or other mechanism to identify a point within the content, to which metainformation can be associated. The counter/timer can be set to zero prior to initiating playback of the content, and then incremented with forward play of the content, or decremented with a reverse operation. Any unit of measure, including a unit of time (e.g., minute, second, millisecond, etc.), a data unit (e.g., frame) can be used with the counter/timer. In accordance with one or more embodiments, multiple counters/timers can be used. In accordance with one or more embodiments, a time associated with a tag can be determined based on the current playback time, e.g., a value of a counter/timer, that the tag is input. By way of a non-limiting example, the tag's time can be the value of the counter/timer at the time that the user inputs the tag, using one of the metainformation I/O controls 318, e.g., a button, text input, etc.

In accordance with at least one embodment, each list is positioned within the boundaries of a display that displays the associated content. By way of a non-limiting example, a list scrolls in the display as the content is being experienced via player 302. As discussed, player 302 can comprise a counter or timer that can identify a current time during the playback of the content. In accordance with one or more embodiments, each list that is displayed is bound to the current time, e.g., a playback time, of the content, so that the list content scrolls in correspondence, and synchronized, with the current time and with the progression of the content being played. By way of a further non-limiting example, the current playback time is incremented as the content is being played and multiple ones of the tags that are close to the current playback time are displayed. By way of yet a further non-limiting example, one of the displayed tags determined to have an associated time that is closest to the current playback time is visually differentiated from the other tags in the list, such as by displaying the closest tag in a relative middle of the list, e.g., relative to the top and bottom of the list, and/or is displayed using a different font, color, pitch, italics, bold, etc. than the other displayed tags in the list.

The closest tag can be determined to be the tag that has a time value that is closest to the current playback time. By way of a non-limiting example, the closest tag can be equal to the current playback time. By way of a further non-limiting example, the closest tag can have the smallest time differential of other tags, where a time differential for a tag can be determined to be a difference between the current playback time and a time associated with the tag. In accordance with one or more embodiments, the time differential can be the absolute value of the difference between the current playback time and the tag's time. As the video continues playing, the list scrolls in a scrolling direction, e.g., top to bottom, bottom to top, right to left, left to right, diagonally, etc., and another tag can become the closest tag relative to the other displayed tags. In addition, one or more tags can be scrolled out of the display in order to show one or more new tags in the sequence. Displaying a new tag can result in the earliest tag displayed scrolling out of view on the display, for example.

FIG. 4 provides an example of a display in accordance with one or more embodiments of the present disclosure. Display 400 comprises a video content display component 402 and a tag list display component 404. The video content display component 402 displays video content, and the tag list display component 404 comprises a list of tags associated with the video content. In the example shown, the tag list comprises the word tags "plane", "plane", "flight", "map", etc., displayed in a vertical column, with each tag being displayed in a row of the column. In accordance with one or more embodiments, the tag list display component 404 is superimposed on the video content display component 402, and scrolls in the direction of arrow 408, e.g., from the bottom of the video content display component 402 toward the top of the video content display component 402. Three boxes 406A, 406B and 406C are used for illustrative purposes, but could be a part of the display, in accordance with one or more alternative embodiments. Box 406B corresponds to a current playback time, e.g., "same video time," of the video content being displayed in the video content display component 402. The tag, e.g., "fire", displayed in the box 406B has an associated time that corresponds to the current playback time of the video content. The tags contained in box 406A have associated times that occur before the current playback time. By way of a non-limiting example, the tags contained in box 406A correspond to video content displayed prior to the content currently being displayed in video content display component 402. The tags contained in box 406C have associated times that occur after the current playback time. By way of a non-limiting example, the tags contained in box 406C correspond to video content that is to be displayed by the video content display component 402 after the content currently being displayed by the video content display component 402.

Although the tags are displayed in a vertical column in the example shown in FIG. 4, it should be apparent that the tags can be displayed in any manner, including without limitation in a row comprising multiple columns, in a diagonal manner, using multiple vertical columns, each having one or more rows, and/or horizontal rows, each having one or more columns, etc.

FIG. 5 provides a timing example in accordance with one or more embodiments of the present disclosure. Timelines 502 represent a content playback timeline, or a timeline of content. The time to corresponds to an initial time just prior to play being initiated, e.g., prior to commencing a play operation of the content. The time $t_n$ corresponds to a time at which play is completed, and after which an opportunity to input metainformation input is suspended, in a case that metainformation is permitted only while the content is being played. The times that fall in between, e.g., $t_1$ to $t_{11}$ correspond to content playback times. Each timeline 502A, 502B and 502C corresponds to a different user that provided metainformation. As illustrated in the example of FIG. 5, a user, user, input tags that correspond to times $t_1$, $t_2$, $t_4$, $t_5$, $t_8$ and $t_{10}$, input tags corresponding to another user, user$_2$, have times $t_6$ and $t_9$, and tags corresponding to a third user, user$_3$, have times $t_3$, $t_7$ and $t_{11}$, which times correspond to times during playback of content.

FIG. 6 provides an example of users' tag input and other corresponding metainformation saved by a meta-information server in accordance with one or more embodiments of the present disclosure. Data 602A corresponds to the tags entered by user, data 602B corresponds to the tags entered by the user$_2$, and data 602C corresponds to the tags entered by user$_3$. Data 602 comprises the value of each tag, a time associated with each tag, information to identify a user that entered the tags, and information to identify the content associated with the tags. In accordance with one or more embodiments, in addition to the time information, each tag can include an index that identifies an input order or sequence of the tags. With reference to data 602A, the data comprises a user identifier, "Garcia", which identifies user, a content identifier, e.g., a universal resource locator, and six tags, with associated time information for each tag. Data 602B comprises the user identifier "deepblue" for user$_2$, the same content identifier used in data 602A, two tags and associated time information. Data 602C comprises the user identifier "Robocop" for user$_3$, the same content identifier used in data 602A and 602B, three tags and associated time information.

FIG. 7 provides an example of a display showing more than one list of tags in accordance with one or more embodiments of the present disclosure. Video content display component 702 displays video content, and tag list display component 704 comprises multiple lists of tags associated with the video content. Tag list 704A displays tags input by and associated with user, tag list 704B displays tags input by and associated with user$_2$, and tag list 704C displays tags input by and associated with user$_3$. In the example shown in FIG. 7, the tag lists 704 are displayed in separate columns, which are differentiated from one another using a different background color for each column. In accordance with one or more embodiments, each row in a column corresponds to a portion of multimedia content, e.g., a piece of multimedia content corresponding to a time $t_x$ between times $t_0$ and $t_n$ of timelines 502A to 502C. In a case that a tag exists for the time corresponding to a row in a column, the row displays the tag. In a case that no tag exists for the time corresponding to a row in a column, the row is empty. In the example shown FIG. 7, the tags appear to be spaced relative to each other and based on the times associated with each tag. By way of a non-limiting example, in a case that the tag display scrolls from latest/bottom to earliest/top, the earliest tag, "universal", input by user$_1$ at time $t_1$ is displayed at the top of the display in tag list 704A, followed by the next tag in time, "large", input by user$_1$ displayed in tag list 704A. The next tag in time is the "catface" tag input by user$_3$ at time $t_3$. The space between the "large" and "fingers" tags in tag list 704A is spaced farther apart than the "universal" and "large" tags displayed in tag list 704A. In addition, the "catface" tag is spaced a distance from the top of tag list 704C to signify that the "universal" and "large" tags occurred earlier in time relative to the time associated with the "catface" tag. Spacing can be similarly used to show relative times associated with tags across the multiple tag lists displayed.

In addition and in accordance with one or more embodiments, each column has a heading that identifies the user associated with the tags listed in the column. In addition and in the example shown, the tag, e.g., "screen", that is the closest to the current play time for the content regardless of which column, or user, is emphasized. As is discussed, the tag can be emphasized by altering its appearance so that its appearance is different from that of the other tags displayed. By way of some non-limiting example, the tag's appearance can be altered using the font, pitch, color, boldface, italics, etc.

In accordance with one or more embodiments, controls can be provided to allow the user to turn the tags lists on or off, select the tag lists to be displayed, and/or eliminate one or more tag lists. The tag lists that are to be displayed can be determined based on user preferences, expressed, implied or both.

FIG. 8 provides a server event processing flow in accordance with one or more embodiments of the present disclosure. The process flow can be implemented by one or more servers. At step 802, a determination is made of the type of event received by the server. By way of a non-limiting example, an event can comprise a message received via the network. If it is determined at step 802 that the event is a content request, processing continues at step 804 to retrieve the requested content. By way of a non-limiting example, the content can be identified by its URL received with the request. The content request is received by a media server, such as server 102, server 202A, or content source provider 306. In response to the content request, the media server retrieves the content from a content repository, such as data repository 108 or content repository 208A, at step 804. At step 806, the requested content retrieved by the media server is transmitted to the requester. Processing continues at step 802 to process another received event, if any.

If it is determined that step 802 that the received event is a request for metainformation, processing continues at step 808 to retrieve the requested meta-information. By way of a non-limiting example, the metainformation request can include the URL of the content retrieved and transmitted in response to a content request. The metainformation request is received by a metainformation server, such as server 102, media server 202B, or metainformation provider 308. In response to the metainformation request, metainformation is retrieved from a repository, such as data repository 108 or UGC repository

208B. At step 810, the requested metainformation retrieved from the repository is transmitted to the requester. As discussed, the metainformation can correspond to more than one user. In such a case, the metainformation associated with each of the users can be retrieved, and transmitted to the requester. As is discussed, in accordance with one or more embodiments, the metainformation can be filtered to remove one or more user's tags using filtering criteria, such as user preferences, which can be express or implicit preferences, for example. Processing continues at step 802 to process any further events received.

FIG. 9 provides a server metainformation event processing flow in accordance with one or more embodiments of the present disclosure. At step 902, a determination is made whether metainformation is received, e.g., from device 104. The metainformation can be received by a metainformation server, such as server 102, media server 202B, or metainformation provider 308. If so, the received metainformation is collected by the media server, and processing continues at step 802 to process any further events received, if any. Referring again to FIG. 9, if it is determined that the event is not a metainformation received event at step 902, processing continues at step 904. At step 904, a determination is made whether the event indicates an end of content event. In such a case, the event comprises a notification that content playback at a user device 104 is finished. Processing continues at step 906 to save the metainformation collected at step 908 during playback of the content in the repository. Collected metainformation is saved to a repository, such as data repository 108 or UGC repository 208B.

FIG. 10 provides a user device process flow in accordance with one or more embodiments of the present disclosure. At step 1002, the user device 104 requests content from a media server, such as a media server identified above. At step 1004, the user device 104 requests metainformation associated with the content request at step 1002. In accordance with one or more embodiments, step 1004 can be optionally performed, e.g., in a case that there is no metainformation associated with the requested content. As discussed above, the content and metainformation requests can identify content using a URL. However, it should be apparent that any mechanism can be used for identifying content. At step 1006, a determination is made whether or not the requested content, and optionally the requested metainformation, is/are received. If not, processing can wait for receipt of the data in response to the request(s) made.

In a case that metainformation is requested and received, processing continues at step 1008 to sort the tags received in the metainformation by time in user, as discussed above. Processing continues at step 1010 to output the content, and optionally the associated tags sorted by time and optionally by user, in a case that tags are associated with multiple users. At step 1012, a determination is made whether or not user input is received, e.g., via a user device 104. If not, processing continues at step 1012, to watch for user input, as the content, and optionally associated tags, is/are being output, e.g., by the user device 104.

If user input is received, as determined at step 1012, processing continues at step 1102 of FIG. 11. FIG. 11 provides a user input process flow in accordance with one or more embodiments of the present disclosure. At step 1102, determination is made whether the user input is playback control input, e.g., play, stop, pause, reverse, fast forward, etc. If so, processing continues at step 1104 to process the playback control input. In accordance with one or more embodiments, the playback controls also control the tag list display. By way of a non-limiting example, scrolling of the tag list is paused when playback of the multimedia content is paused, the tag list scrolling is fast forwarded or reversed when the corresponding multimedia content is fast forwarded or reversed, and/or the tag list scrolling is stopped when the multimedia content playback is stopped. Processing continues at step 1010 of FIG. 10 to output, or continue outputting, the content and optionally the tags associated with the content, in accordance with the play control input.

Referring again to FIG. 11, if the user input is determined to be other than play control input at step 1102, processing continues at step 1106 to determine whether or not the user input comprises tag input. If so, processing continues at step 1108 to transmit the tag value input by the user and any other associated metainformation to the media server. By way of some non-limiting examples, the associated metainformation can comprise information that identifies the user providing the input, e.g., user ID, network address, information identifying the user device 104, etc., time information associated with the input, and information that identifies the content being played at the user device 104. Processing continues at step 1010 of FIG. 10 to continue outputting the content, and optionally the tags associated with the content.

Referring again to FIG. 11, if the user input is determined to be other than play control and tag input, processing continues at step 1110 to determine whether the input signals an end of content, e.g., a signal generated by player 302 and/or content control(s) 316. If such a signal is generated, as determined at step 1110, processing continues at step 1112 to transmit an end of content notification to the media server. Processing continues at step 1012 to await further user input, e.g., a play control.

In accordance with one or more embodiments, a media server, such as a server described above, serves one or more pages, as discussed above. In accordance with one or more such embodiments, the user interface served by the media server can include one or more of player 302, content control(s) 316 and metainformation I/O control(s) 318. Furthermore and in accordance with one or more embodiments, the media server can perform the function of sorting the tags by user and/or time before forwarding them to a user device 104.

By way of a non-limiting example, one or more embodiments of the present disclosure have use in connection with a video tag game architecture. Video content comprises video game content that is served from a server that provides video game content. The video game content served by the server is received and displayed by a video tag game application, or gaming application, that executes on a user device. The gaming application can be a Flash application, for example, which comprises a player, controls for displaying the video content served by the video content server and controls to receive metainformation user input and feed user metainformation, e.g., in the form of one or more tag lists, to the video content display control for display at the user device. The metainformation server, e.g., a server other than the video game content server, manages user inputs, and collects and stores tags received from the user. The metainformation server can communicate with the gaming application using the Real Time Messaging Protocol (RTMP) protocol, for example, to serve and receive metainformation information. In accordance with one or more embodiments, in this example, the video game content server is a streaming server, such as a Yahoo! Video Streaming Center server and the metainformation server comprises a Red5 server. At a given point, the Red5 server collects the tags from the different users and serves them to the gaming application executing on each participating user device. By way of a non-limiting example, the Red5 server can send the metainformation to the user device in response to a notification by the gaming application that playback of the video content has completed and no further metainformation is to be input by a user. By way of a further non-limiting example, the notification can be triggered at the end of a video tag game when the streamed video display is finished, e.g., the video has been experienced by one or more users of the game, and the users have provided all of the tags related to the experienced content. In accordance with one or more embodiments, the gaming application sorts the received lists by time and user and repeats playback of the video content, e.g., by receiving the content from the Yahoo! Streaming Center, or by receiving a playback control from a user. In accordance with one or more alternative embodiments, the Red5 server can sort the lists by time and user prior to serving the metainformation to the user devices. The received video stream is displayed in a display of the gaming application's video player, and the current video playback time is used to control scrolling and emphasis of the tags in the one or more lists displayed in the gaming application's display.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more disclosed embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A non-transitory computer readable medium comprising instructions for generating a user interface comprising:
    a content player window being provided via a display of a computing device, the content player window for use with a multimedia content player to play video content; and
    a metainformation display portion of the content player window that displays tags received from multiple users and associated with the video content played by the player,
        the tags being displayed in the metainformation display portion as multiple lists that scroll in synchronization with play of the video content, each list of the multiple lists displays the tags received from a respective user and the tags are superimposed over at least a portion the video content being played, and
        each of the tags has a time and a tag that has a time that is closest to a current playback time relative to the times of other ones of the tags is differentiated from other tags being displayed.

2. The computer readable medium of claim 1, further comprising play controls to control playback of the video content, scrolling of the list of tags being controlled by the play controls that control the video content's play.

3. The computer readable medium of claim 1, such that each of the multiple lists scrolls in correspondence with the other lists, and in synchronization with the video content's play.

4. The computer readable medium of claim 1, such that the metainformation display portion comprises multiple display columns, one for each of the multiple lists, each of the multiple columns having a background color, and each background color is different from the background colors used for other ones of the multiple columns.

5. The computer readable medium of claim 4, such that each column has a column heading that includes an identity of the user associated with the tags displayed in the column.

6. The computer readable medium of claim 4, such that each row in the user's column corresponds to an underlying portion of the video content, if a tag corresponding to the user exists for the portion of the video content, the existing tag is displayed in the row in the user's column while the portion of the video content is being played.

7. The computer readable medium of claim 4, such that each row in the user's column corresponds to a portion of the video content, if no tag corresponding to the user exists for the portion of content, the row in the user's column is empty while the portion of content is being played.

8. The computer readable medium of claim 1, such that each tag that has a time that is closest to a current playback time relative to the times of other ones of the tags is differentiated by at least one of font, pitch, color, boldface and italics.

9. A device comprising a memory and a processor, the memory storing and the processor executing program code to generate:
    a multimedia content player that controls play of video content in a player window; and
    a metainformation display control that displays multiple lists of tags received from multiple users and associated with the video content, the multiple lists of tags being scrolled on the display in synchronization with the video content's play, each list of the multiple lists displays the tags received from a respective user, the tags being displayed in a metainformation display portion that is superimposed over at least a portion of the video content being played in the player window,
    said metainformation display control controls the metainformation display portion, such that each of the tags corresponds to a time and a displayed tag that has a time that is closest to a current playback time relative to the times of other ones of the tags is differentiated from other tags being displayed.

10. The device of claim 9, said multimedia player controls the video content's play in response to received playback control input.

11. The device of claim 9, each list scrolls in synchronization with the video content's play.

12. The device of claim 11, said metainformation display control controls the metainformation display portion such that each of the multiple lists scrolls in correspondence with the other lists, and in synchronization with the video content's play.

13. The device of claim 11, such that the metainformation display portion comprises multiple display columns, one for each of the multiple lists, said metainformation display control controls the metainformation display portion such that each of the multiple columns has a background color that is different from the background color used for other ones of the multiple columns.

14. The device of claim 13, said metainformation display control controls the metainformation display portion, such that each column has a column heading that identifies the user associated with the tags displayed in the column.

15. The device of claim 13, such that each row in the user's column corresponds to an underlying portion of the video content, said metainformation display control controls the metainformation display portion such that if a tag corresponding to the user exists for the portion of the video content, the existing tag is displayed in the row in the user's column while the portion of the video content is being played.

16. The device of claim 13, such that each row in the user's column corresponds to an underlying portion of the video content, said metainformation display control controls the metainformation display portion such that if no tag corresponding to the user exists for the portion of the video content, the row in the user's column is empty while the portion of the video content is being played.

17. The device of claim 13, such that a displayed tag that has a time that is closest to a current playback time relative to the times of other ones of the tags is differentiated by at least one of font, pitch, color, boldface and italics.

18. A method comprising:
    transmitting, via a computing device, a request for video content;
    transmitting, via the computing device, a request for metainformation corresponding to the requested video content; and
    receiving, via the computing device, the requested video content and metainformation, the metainformation comprising tags received from multiple users and corresponding to the requested video content, each tag received being created during a prior playback of the requested video content; and
    playing the video content, via a player window and the computing device,
    scrolling, in a metainformation display portion of the player window, at least a portion of the received tags in synchronization with the video content's play, the metainformation display portion being superimposed over at least a portion of the video content being played in the player window,
    displaying the tags in the metainformation display portion as multiple lists, each list of the multiple lists displays the tags received from a respective user, and
    displaying each tag that has a time that corresponds to a current playback time so that the tag is differentiated from other tags being played.

19. The method of claim 18, further comprising:
    transmitting at least one tag input while the received video content is being played to a metainformation server, so that the transmitted at least one tag can be stored in a metainformation repository.

20. The method of claim 18, such that metainformation received with each tag comprises time information, said method further comprising:
    sorting the set of tags using the time information.

21. The method of claim 18, such that metainformation received with each tag comprises time and user identification information, said method further comprising:
    sorting the received tags using the user identification information to generate at least one set of tags, each set of tags corresponds to one user, and sorting the tags in each set using the time information.

22. The method of claim 18, such that the tags corresponding to the video content are associated with more than one user, said displaying further comprising:
    scrolling each list in synchronization with the video content's play.

23. The method of claim 22, said displaying further comprising:
    displaying multiple display columns, one for each of the multiple lists, each of the multiple columns having a background color, and each background color is different from the background color used for other ones of the multiple columns.

24. The method of claim 23, said displaying further comprising:
    displaying a column heading for each column, the column heading identifying the user associated with the tags displayed in the column.

25. The method of claim 23, such that each column corresponds to a user and each row in a column corresponds to a portion of the video content, said displaying further comprising:
    if a tag corresponding to the user exists for the portion of the video content, displaying the existing tag in the row in the user's column while the portion of the video content is being played.

26. The method of claim 22, such that each tag that has a time corresponding to a current playback time is differentiated by at least one of font, pitch, color, boldface and italics.

27. A computer-readable non-transitory medium tangibly storing thereon computer readable instructions that when executed cause at least one processor to:
    transmit a request for video content;
    transmit a request for metainformation corresponding to the requested video content; and
    receive the requested video content and metainformation, the metainformation comprising tags received from multiple users and corresponding to the requested video content, each tag received being created during a prior playback of the requested content; and
    play the video content in a player window and
    display in a metainformation display portion at least a portion of the received tags as multiple lists, each list of the multiple lists displays the tags received from a respective user, the portion of the received tags is scrolled in synchronization with the video content's play, the metainformation display portion is superimposed over at least a portion of the video content being played in the player window, and
    display a tag that has a time that is closest to a current playback time relative to the times of other ones of the tags so that the tag is differentiated from other tags being played.

28. The medium of claim 27, the computer readable instructions that when executed further cause the at least one processor to:

transmit at least one tag input while the received video content is being played to a metainformation server, so that the transmitted at least one tag can be stored in a metainformation repository.

29. The medium of claim 27, such that metainformation received with each tag comprises time information, the computer readable instructions that when executed further cause the at least one processor to:
sort the set of tags using the time information.

30. The medium of claim 27, such that metainformation received with each tag comprises time and user identification information, the computer readable instructions that when executed further cause the at least one processor to:
sort the received tags using the user identification information to generate at least one set of tags that corresponds to one user, and sorting the tags in each set using the time information.

31. The medium of claim 27, such that the tags corresponding to the video content are associated with more than one user, the computer readable instructions that when executed cause the at least one processor to display further comprising computer readable instructions that when executed cause the at least one processor to:
scrolling each list in synchronization with the video content's play.

32. The medium of claim 31, the computer readable instructions that when executed cause the at least one processor to display further comprising computer readable instructions that when executed cause the at least one processor to:
display multiple display columns, one for each of the multiple lists, each of the multiple columns having a background color, and each background color is different from the background color used for other ones of the multiple columns.

33. The medium of claim 32, the computer readable instructions that when executed cause the at least one processor to display further comprising computer readable instructions that when executed cause the at least one processor to:
display column heading for each column, the column heading identifying the user associated with the tags displayed in the column.

34. The medium of claim 32, such that each column corresponds to a user and each row in a column corresponds to a portion of the video content, the computer readable instructions that when executed cause the at least one processor to display further comprising computer readable instructions that when executed cause the at least one processor to:
display the existing tag in the row in the user's column while the portion of the video content is being played if a tag corresponding to the user exists for the portion of the video content.

35. The medium of claim 27, such that each tag that has a time that is closest to a current playback time relative to the times of other ones of the tags is differentiated by at least one of font, pitch, color, boldface and italics.

36. A method comprising:
receiving, via at least one server computer, a request for video content;
receiving, via the at least one server computer, a request for metainformation corresponding to the requested content; and
transmitting, via the at least one server computer, the requested content and metainformation, the metainformation comprising multiple tags received from multiple users and corresponding to the requested video content, each tag being in connection with a prior playback of the requested video content, the requested video content for playing in a user interface made available via the at least one server computer, the user interface comprising a player window and a metainformation display portion superimposed over at least a portion of the requested video content being played in the player window, the tags are displayed as multiple lists, each list of the multiple lists displays those tags of the multiple tags received from one of the multiple users, the tags for scrolling in the metainformation display portion in synchronization with the video content's play, and
each of the tags has a time and a tag that has a time that is closest to a current playback time relative to the times of other ones of the tags is differentiated from other tags being displayed.

37. The method of claim 36, the user interface further comprising play controls to control playback of the video content, the scrolling of the list being controlled by the play controls that control the video content's play.

38. The method of claim 36, each list scrolls in correspondence with the other lists and in synchronization with the video content's play.

39. The method of claim 38, such that the metainformation display portion comprises multiple display columns, one for each of the multiple lists, each row corresponds to a portion of the video content, if a tag of the multiple tags corresponds to the portion of the video content, the tag is displayed in the row in the user's column while the portion of the video content is being played, and if no tag corresponding to the user exists for the portion of the video content, the row in the user's column is empty while the portion of the video content is being played.

40. A system comprising:
at least one server computer, the at least one server computer comprising at least one processor for executing and memory for storing instructions that when executed cause the at least one server computer to:
receive a request for metainformation corresponding to requested video content; and
transmit the requested content and metainformation, the metainformation comprising multiple tags received from multiple users and displayed in multiple lists corresponding to the requested video content, each list comprising tags received from a respective one of the multiple users wherein each tag being in connection with a prior playback of the requested video content, the requested video content for playing in a user interface made available via the at least one server computer, the user interface comprising a player window and a metainformation display portion superimposed over at least a portion of the requested video content being played in the player window, the multiple tags for scrolling in the metainformation display portion from in synchronization with the video content's play, wherein
the metainformation further comprising a time for each of the tags has such that a tag that has a time that is closest to a current playback time relative to the times of other ones of the tags is differentiated from other tags being displayed.

41. The system of claim 40, the user interface further comprising play controls to control playback of the video content, the scrolling of the list being controlled by the play controls that control the video content's play.

42. The system of claim 40, each list scrolls in correspondence with the other lists and in synchronization with the video content's play.

43. The system of claim 42, such that the metainformation display portion comprises multiple display columns, one for each of the multiple lists, each row corresponds to a portion of the video content, if a tag of the multiple tags corresponds to the portion of video content, the tag is displayed in the row in the user's column while the portion of video content is being played, and if no tag corresponding to the user exists for the portion of video content, the row in the user's column is empty while the portion of video content is being played.

44. A computer readable non-transitory storage medium for tangibly storing thereon computer readable instructions that when executed cause at least one processor to:

receive a request for video content;

receive a request for metainformation corresponding to the requested video content; and transmit the requested video content and metainformation, the metainformation comprising tags received from multiple users and corresponding to the requested content, each tag being in connection with a prior playback of the requested video content, the requested content for playing in a user interface made available via the at least one server computer, the user interface comprising a player window and a metainformation display portion superimposed over at least a portion of the video content being played in the player window, multiple lists of the tags for scrolling in the metainformation display portion in synchronization with the video content's play, each list comprising tags received from a respective one of the multiple users, each of the tags has a time and a tag that has a time that is closest to a current playback time relative to the times of other ones of the tags is differentiated from other tags being displayed.

45. The medium of claim 44, the user interface further comprising play controls to control playback of the video content, the scrolling of the list being controlled by the play controls that control the video content's play.

46. The medium of claim 44, each list scrolls in correspondence with the other lists and in synchronization with the video content's play.

47. The medium of claim 46, such that the metainformation display portion comprises multiple display columns, one for each of the multiple lists, each row corresponds to a portion of the video content, if a tag of the multiple tags corresponds to the portion of the video content, the tag is displayed in the row in the user's column while the portion of the video content is being played, and if no tag corresponding to the user exists for the portion of the video content, the row in the user's column is empty while the portion of the video content is being played.

* * * * *